United States Patent
Monty et al.

(10) Patent No.: US 11,359,366 B2
(45) Date of Patent: Jun. 14, 2022

(54) STRUCTURAL CONNECTOR FOR FASTENING STRUCTURAL COMPONENTS IN INSULATED CONCRETE FORMWORK

(71) Applicant: Burmon Holdings Pty Ltd, Paradise Point (AU)

(72) Inventors: Stephen Monty, Bogangar (AU); Michael James Burchell, Runaway Bay (AU)

(73) Assignee: Burmon Holdings Pty Ltd, Paradise Point (AU)

( * ) Notice: Subject to any disclaimer, the term of this patent is extended or adjusted under 35 U.S.C. 154(b) by 0 days.

(21) Appl. No.: 17/120,457

(22) Filed: Dec. 14, 2020

(65) Prior Publication Data

US 2021/0214932 A1 Jul. 15, 2021

Related U.S. Application Data

(60) Provisional application No. 62/960,709, filed on Jan. 14, 2020.

(51) Int. Cl.
*E04B 1/41* (2006.01)

(52) U.S. Cl.
CPC .... *E04B 1/4121* (2013.01); *E04B 2001/4192* (2013.01)

(58) Field of Classification Search
CPC .......... E04B 1/4121; E04B 2001/4192; E04B 2005/176; E04B 2005/324; E04B 1/2612; E04B 1/7637; E04C 5/163; E04C 5/162; F16B 9/054; F16B 13/141; F16B 37/125
See application file for complete search history.

(56) References Cited

U.S. PATENT DOCUMENTS

| | | | |
|---|---|---|---|
| 1,072,361 A * | 9/1913 | Rickman | E04B 1/4121 52/699 |
| 6,350,093 B1 * | 2/2002 | Petersen | F16B 33/002 411/178 |

* cited by examiner

*Primary Examiner* — Patrick J Maestri
(74) *Attorney, Agent, or Firm* — Vidas, Arrett & Steinkraus, PA; Richard A. Arrett; Edwin E. Voigt, II

(57) ABSTRACT

The present invention relates to a device and a method associated with the device. With respect to the device, it is a structural connector for fastening structural components in insulated concrete formwork (ICF). The structural connector consists of a double threaded cylinder bolt assembly that aligns through openings in the ICF wall. One end of the cylinder bolt assembly embeds into the cavity of the ICF wall where openings in the cylinder bolt assembly receive concrete and reinforcement bars. The other end of the cylinder bolt assembly is threaded to receive a double threaded washer head bolt. The cylinder bolt assembly is used to mount ledger boards, floor joist hangers and roof truss connectors to the ICF wall, locking them together acting as one unit in withstanding bending and uplift loads imposed by large forces such as floor and roof truss systems.

12 Claims, 8 Drawing Sheets

STRUCTURAL CONNECTOR FOR FASTENING STRUCTURAL COMPONENTS IN INSULATED CONCRETE FORMWORK

BACKGROUND

1. Field of the Invention

The invention relates generally to a structural connector for fastening structural components in insulated concrete formwork.

2. Background

There are currently multiple methods to connect floor joists, floor and roof trusses and beams to the insulated concrete formwork (ICF) wall. The most common method is to attach a wood or steel ledger board to the ICF wall and then attach joist hangers to that ledger board to receive the floor joists and roof trusses. The components of conventional ledger connectors are designed to connect the wood or steel ledger to a bracket or steel plate mounted on the face of the ICF wall. This typical design is costly as it requires heavy duty steel brackets and plates and a large number of heavy duty screws to secure the connection. The reason these conventional ledger connectors require heavy duty steel plates, brackets and screws is to compensate for the unsupported load transfer span between the polystyrene outer and inner wall of the ICF block or panel.

These conventional ledger connectors can be labour intensive to install. Also, drilling long heavy duty screws through thick steel plates often result in power drills being worn out prematurely, damaged or destroyed.

The other method to connect floor joists, floor and roof trusses and beams to an ICF wall is to use a one piece bracket or hanger that is inserted through the ICF wall. This typical design of bracket is made from heavy duty steel.

This system requires a very high level of expertise from the contractor to install and set into position because once the concrete is poured and set, if the hangers or brackets are just slightly out of position, the floor system or roof system will be out of level.

To compensate for movement of these types of conventional hangers, during the concrete pour, a wooden ledger is installed underneath the hangers and are nailed to it to hold the hangers in position.

These hangers and the wooden ledger often get in the way of the temporary bracing system that is used by installers to ensure the ICF wall remains straight during the concrete pour.

SUMMARY OF THE INVENTION

Insulating concrete forms (ICFs) are modular units in the form of interlocking blocks or panels, made from polystyrene or polyurethane foam and filled with concrete. ICFs create predictable high performance walls in which substantial thermal mass and structural support is contained in easily stacked and joined insulation.

The sealed nature of the construction and the high levels of insulation make this method particularly suited to projects seeking to achieve the very high levels of performance benchmarked by programs like the increasingly influential 'passive house'.

Insulated Concrete Form building structures often include floor systems and roof truss systems made from floor joists, roof and floor trusses and beams. These joists, beams and trusses are connected to the ICF wall using heavy duty brackets, steel plates, wood and steel ledgers and hangers that support the heavy loads imposed on them from these floor and roof truss systems.

It is desirable to have structural connector that has the capacity to support high loads both vertically and laterally. Furthermore, it is desirable to have a structural connector that connects wood or steel ledgers and joist hangers directly to the reinforced concrete within the ICF wall delivering enhanced stability, stiffness and strength. Furthermore, it is desirable to have a structural connector that is able to receive reinforcing bars in the concrete both horizontally and vertically providing higher load capacities than conventional connectors.

The components of conventional structural connectors are not made to connect multiple structural components to an ICF wall. Conventional connectors are bulky, expensive and designed for single applications only, either connecting a ledger board or connecting a joist hanger to an ICF wall. It has heretofore not been discovered how to make a structural connector for ICF construction that can be used in multiple applications as well be easier to install and less expensive to make. Therefore, a current need exists in the market for a structural connector for fastening structural components in insulated concrete walls that overcomes these shortcomings of conventional ledger connectors and joist hangers.

The device may also be installed through openings in the ICF wall without secondary components attached such as ledger brackets, joist and roof truss hangers. These secondary components can be bolted to the structural connector on the outside of the ICF wall after the concrete is poured and after the ICF bracing has been removed.

Furthermore, the device may be used but not limited to attaching interior partition walls and wood and steel cabinets to the ICF wall.

The disclosed device is unique when compared with other known devices and solutions because it provides (1) A single structural connector that can be used in multiple applications including mounting joist hangers and ledger boards to ICF wall systems. This saves on manufacturing costs for structural connectors providing the connector at a lower cost. (2) A single structural connector for ledger boards fits all wood size thicknesses, also saving on manufacturing costs. (3) The main fixing point of the disclosed device utilises a one piece bolt assembly system that fixes structural components such as joist hangers and ledger boards to itself which is embedded in the cured concrete of the ICF wall system.

Similarly, the associated method is unique because the cylinder bolt assembly is faster and easier to install requiring only two bolts to fix structural components to an ICF wall over other systems that require 8 or more heavy duty screws and heavy duty brackets.

Similarly, the disclosed method is unique when compared with other known Joist hangers in that it: (1) The cylinder bolt assembly does not protrude from the ICF wall making it easier to install ICF wall bracing systems and pour concrete.

The disclosed device is superior to other known ICF structural connectors because it provides a cylinder bolt assembly (1) which is designed with double and triple sheer points which more efficiently absorbs the energy of the unsupported load transfer span between the polystyrene outer and inner walls of the Insulated concrete wall system; and (2) enhances strength, stiffness of connection, function and durability; and (3) furthermore the cylinder double bolt assembly is adjustable internally which means it able to connect multiple wood and steel sizes to the outside of the ICF wall. (4) Furthermore the cylinder bolt assembly has openings to receive reinforcing bar both vertically and horizontally creating a more secure connection whereas other joist hangers and ledger board connectors only receive reinforcing bar horizontally.

The disclosed method is unique when compared with other ledger connectors and joist hangers because the cylinder bolt assembly connects bolts to structural components directly to the concrete within the ICF wall providing a stiffer more direct connection. Furthermore, the disclosed method also provides an installation where the structural connector is installed flush to the face of the ICF wall eliminating any protrusions to the face of the ICF wall. A surface that has protrusions such as joist hangers and other structural components causes installation problems for the ICF bracing system which is paramount to building a strong and straight ICF wall.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. The A Structural Connector for Fastening Structural Components in insulated concrete formwork (ICF) may, however, be embodied in many different forms and should not be construed as being limited to the embodiments set forth herein; rather, these embodiments are provided by way of illustration only and so that this disclosure will be thorough, complete and fully convey understanding to those skilled in the art.

DETAILED DESCRIPTION

The present invention is directed to a structural connector for fastening structural components in insulated concrete formwork.

In its most complete version, the structural connector is made up of the following components: (1) A metal cylinder tube with generating lines perpendicular to the bases, with its ends closed to form two circular surfaces with a hole perpendicular to its base. One end of the cylinder tube has openings to receive concrete and reinforcement bars both vertically and horizontally. The other end of the metal cylinder tube is threaded and connects to joist hangers, ledgers and ledger brackets by receiving a male double threaded washer head bolt. The metal cylinder tube has a chamber to protect the threaded parts from concrete seeping into them. (2) A double threaded washer head bolt is coupled with the female part of the threaded cylinder tube which connects to the ICF wall system locking the components together as one piece. The double threaded washer head bolt may include a receiving portion to receive a second bolt for the purpose of connecting other structural components with varying widths and thicknesses.

In the preferred embodiment, the disclosed method of attaching structural components such as steel and wood ledger boards and joist hangers to an ICF wall comprises of a cylinder bolt assembly in which the cylinder bolt assembly is fastened to a second structural component. The secondary structural component is usually but not limited to ledger brackets, joist hangers and truss connectors which are bolted to the cylinder bolt assembly. The cylinder bolts align through openings in the ICF Wall and embed into the cavity of the ICF wall. Reinforcement bar may be placed through openings in the cylinder bolts both horizontally and vertically for enhanced strength. Concrete is poured into the ICF wall and the cylinder bolt connector is set into the finished concrete wall. Once the concrete wall is cured, another structural component such as a wood or steel ledger board, Joist, beam, rafter or truss is fixed to the cylinder bolt assembly with bolts, nails or screws.

Figure 1:
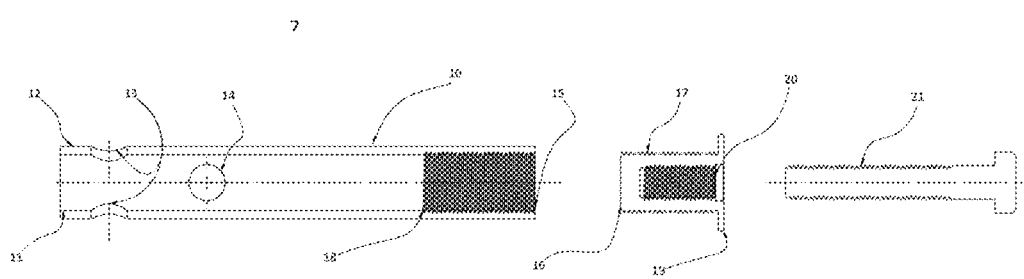
FIG. 1.—shows an exploded side view of a Structural Connector for Fastening Structural Components in insulated concrete formwork (ICF).

FIG. 1 is a diagram illustrating an exploded side view of a structural connector 7 in accordance with the present invention, in the form of a cylinder tube 10: having an inner barrel 11, and an outer barrel 12 and vertical openings 13 and horizontal openings 14 to receive reinforcing bars and concrete. The cylinder tube has a threaded female section 15 to receive a double threaded washer head bolt 16. The cylinder tube 10 section connects with a secondary structural component (shown as an example in element 25 on FIG. 4). The double threaded washer head bolt 16 has an outer thread 17 which mates with the female thread 15 of the cylinder tube 10 connecting all structural components together. The double threaded washer head bolt 16 creates a chamber 18 inside the cylinder tube which protects the female threaded section 15 in the cylinder tube 10 from concrete seeping in. The double threaded bolt 16 has a washer head providing an enlarged surface for applying compressive forces to other structural components 19. The double threaded washer bolt 16 has a female threaded section 20 to receive a second male threaded hex bolt 21 which may also connect secondary structural components (shown as an example in element 26 on FIG. 7) together as one piece.

Figure 6:
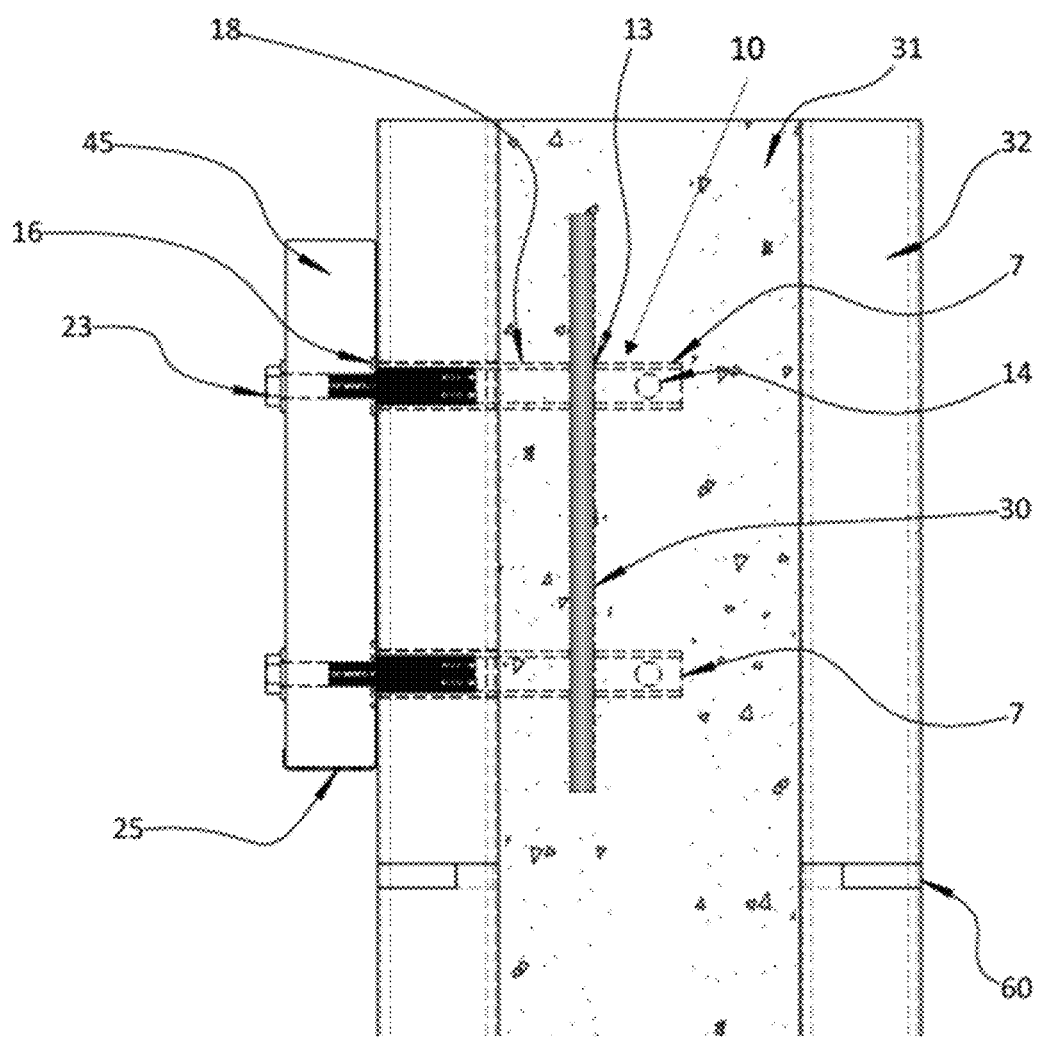
FIG. 6.—shows a side view of a Structural Connector connected to a Structural Component and connected to a Wood ledger bolted into concrete of the insulated concrete formwork (ICF).
Figure 8:
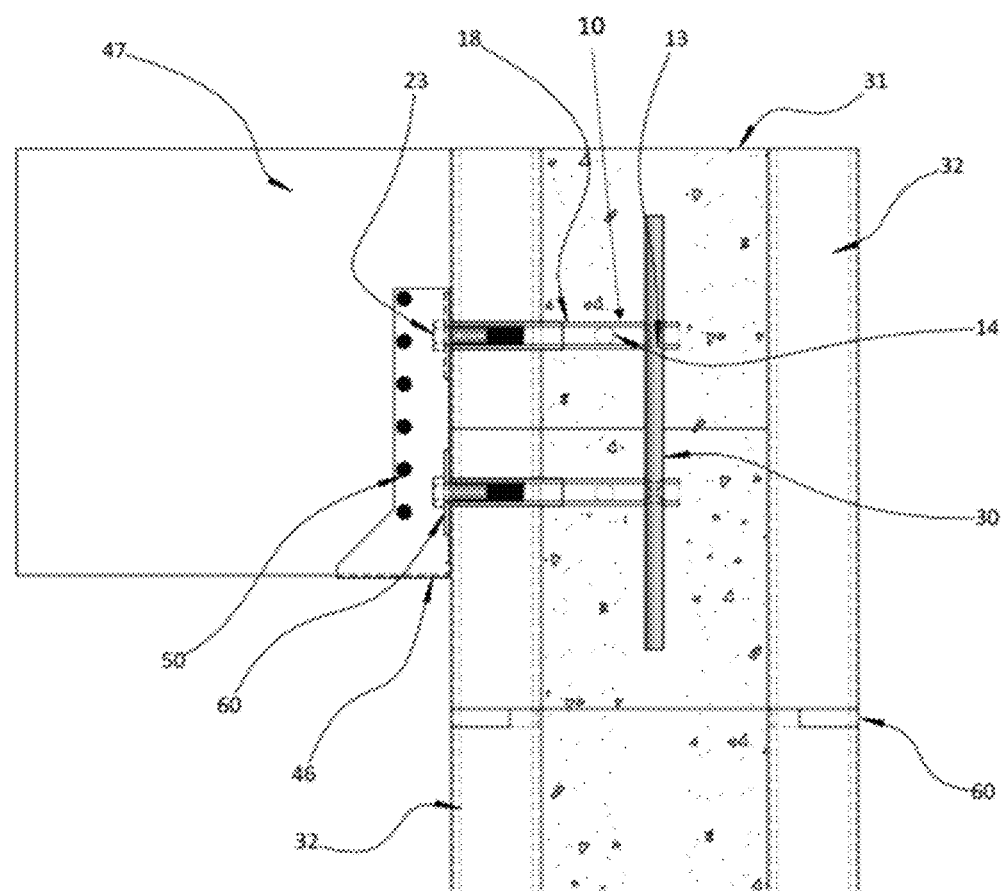
FIG. 8.—shows a side view of a Structural Connector connected to another example of a Structural Component bolted to a Joist beam and cast into the concrete of the insulated concrete wall.

The installation and use of structural connectors in conjunction with ICF formwork may be readily understood with reference to FIGS. 6 and 8.

Figure 2:
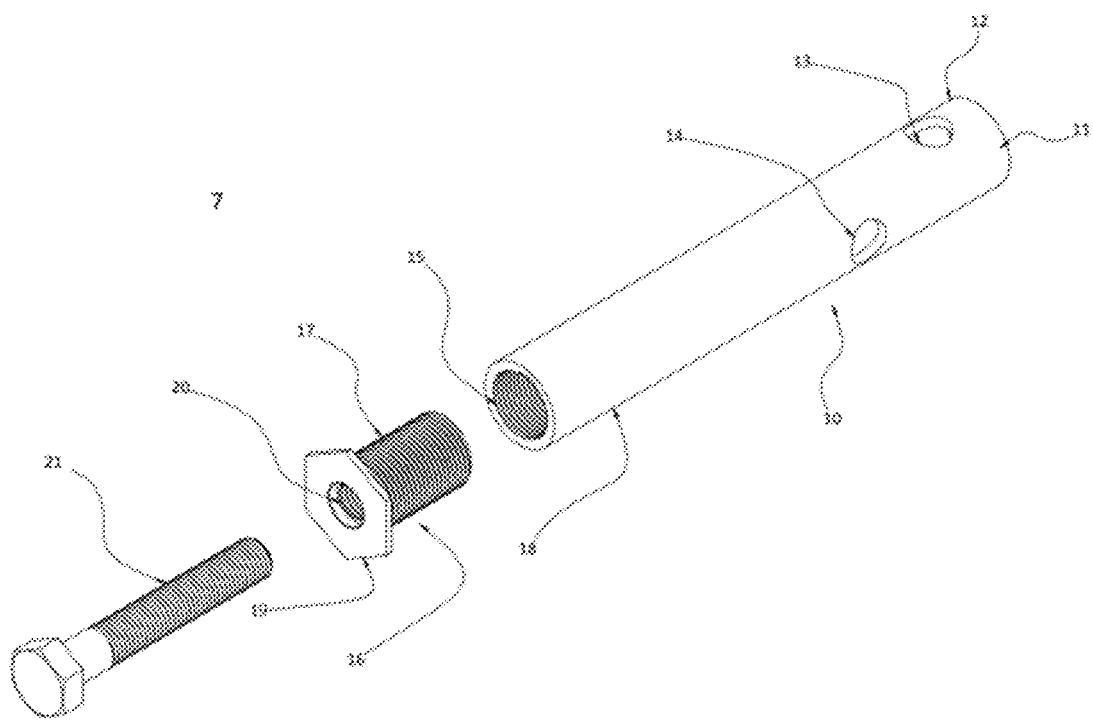
FIG. 2.—shows an exploded isometric view of a Structural Connector for Fastening Structural Components in insulated concrete formwork (ICF).

FIG. 2 shows an exploded isometric view of a structural connector 7.

Figure 3:
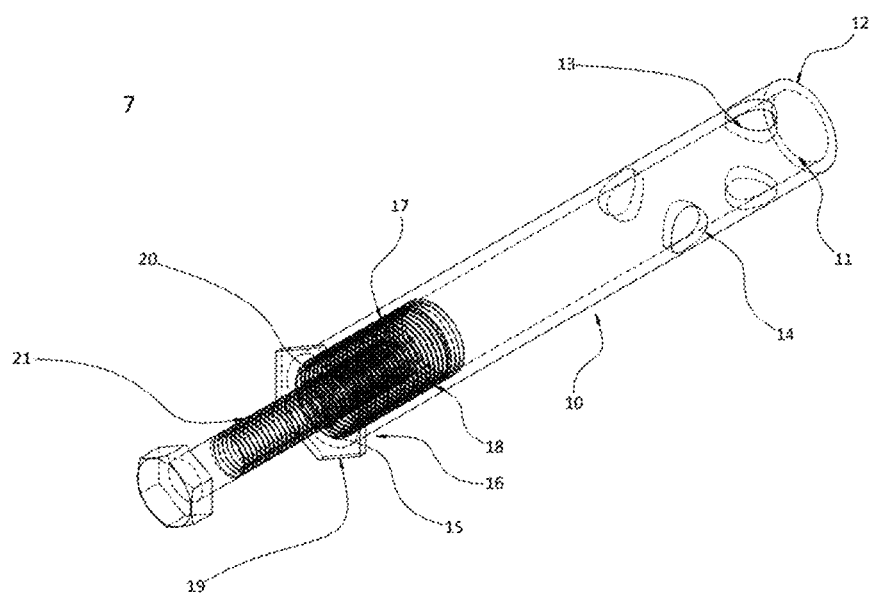
FIG. 3.—shows an isometric view of a Structural Connector bolted together without other structural components attached.

FIG. 3 shows an isometric view of a structural connector 7, in the form of a cylinder tube 10. The cylinder tube 10 has a threaded female section 15 which is connected to a double threaded washer head bolt 16. The double threaded washer head bolt 16 has an outer thread 17 which is connected to the female thread 15 of the cylinder tube 10. The double threaded bolt 16 has a washer head 19 providing an enlarged surface for applying compressive forces to other structural components. The double threaded washer bolt 16 has a female threaded section 20 which is connected to a second male threaded hex bolt 21 which may also connect to secondary structural components (shown as an example in element 45 on FIG. 6).

Figure 4:
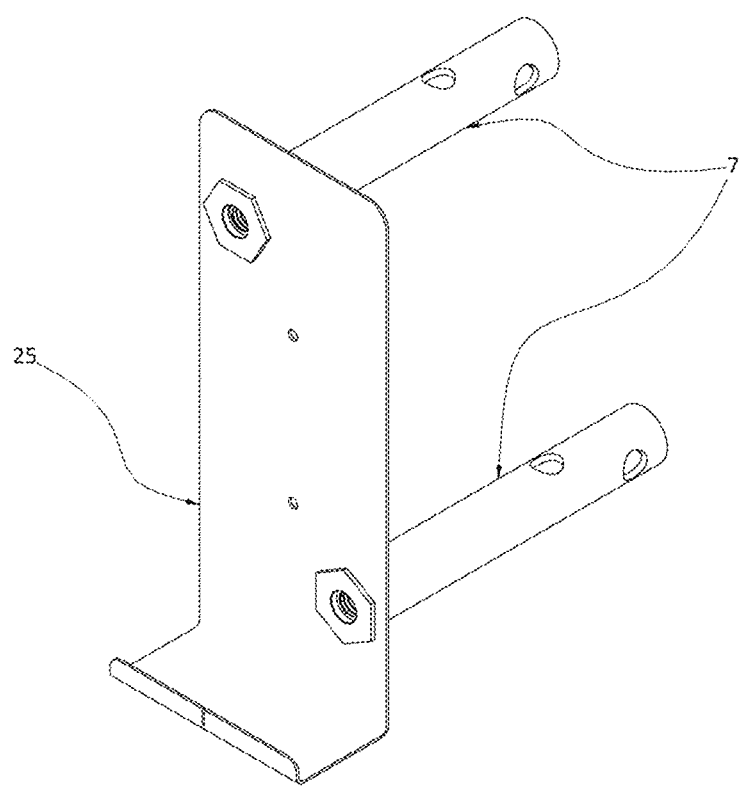
FIG. 4.—shows an isometric view of a Structural Connector fastened to a Structural Component.

FIG. 4.—shows an isometric view of two Structural Connectors 7, fastened to a Structural Component 25, in this case an L Bracket 25 that cradles a wood ledger board (shown as an example in element 45 on FIG. 6).

Figure 5:
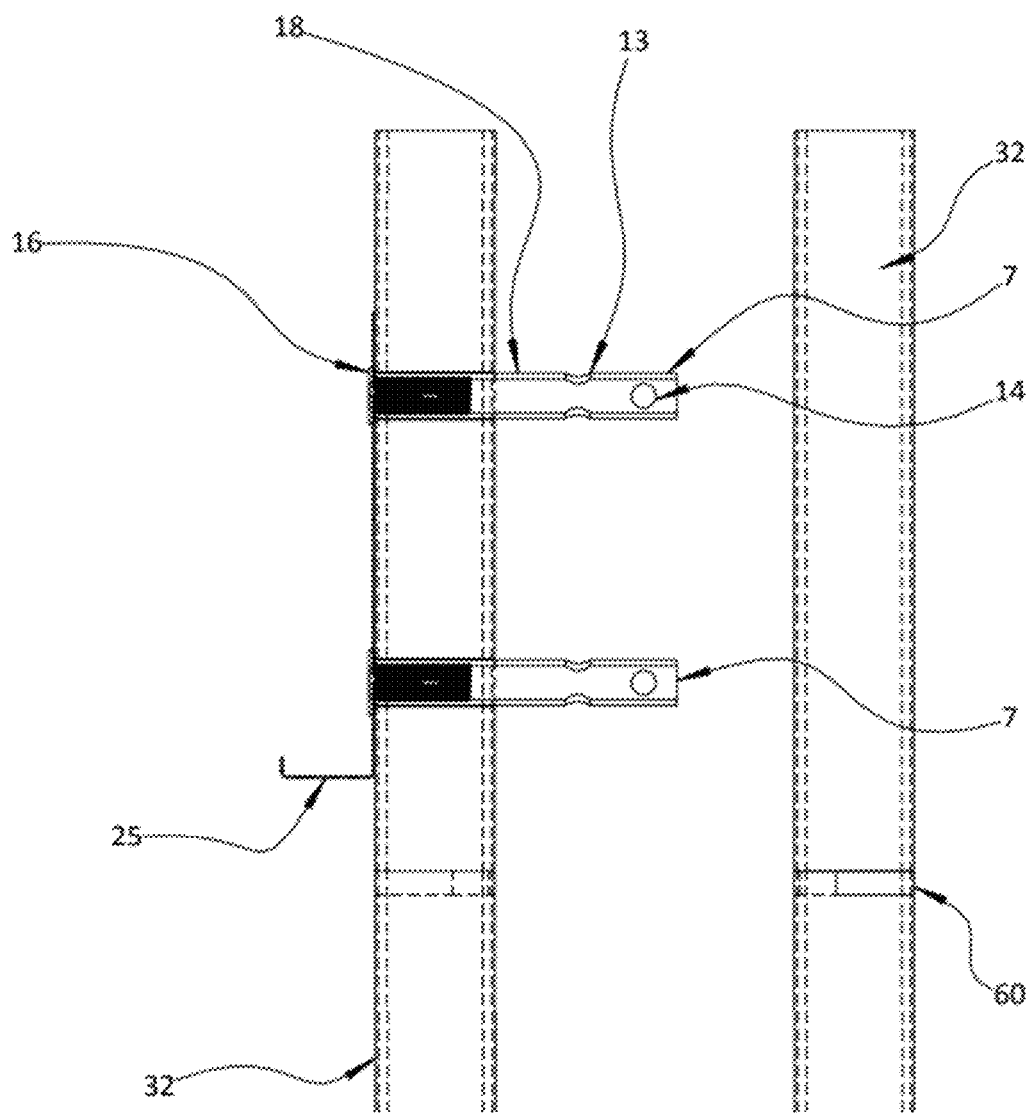
FIG. 5.—shows a side view of a Structural Connector fastened to a Structural Component to the face of the insulated concrete wall.

FIG. 5.—shows a side view of two Structural Connectors 7, fastened to a Structural Component 25, in this case an L-Bracket 25, to the face of the insulated concrete wall 32.

FIG. 6 shows a cross section through an ICF concrete wall 60, showing two structural connectors 7. One end of each structural connector is bolted to a secondary structural component 25, in this case a Ledger bracket 25. The alternate end of the structural connectors 7, as shown as the middle and end of the cylinder tube section of the structural connector 10, is cast into the concrete 31 of the ICF the wall 60. As shown in FIG. 6, the ICF wall assembly 60 comprises of a rigid insulation from polystyrene panels 32, spaced to form a cavity within the ICF wall 60. Vertical holes are drilled through the ICF wall panel 32, to receive the structural connectors 7. The cylinder tube 10 section of the structural connectors 7, is inserted at the appropriate form panel 60, at each desired joist or beam location in the finished wall 32.

Reinforcement bars 30, are optional but may be installed via vertical 13 and horizontal 14 openings in the cylinder tube 10 section of the structural connectors 7. Concrete 31, is then poured into the cavity of the ICF wall 60. Once the concrete 31, is cured, a wood ledger 45, is bolted to the structural connector 7 through openings in the wood ledger 45, to the female section of the double bolt 16 which forms part of the assembly as shown as and described as a Structural Connector for Fastening Structural Components in insulated concrete formwork.

Figure 7:
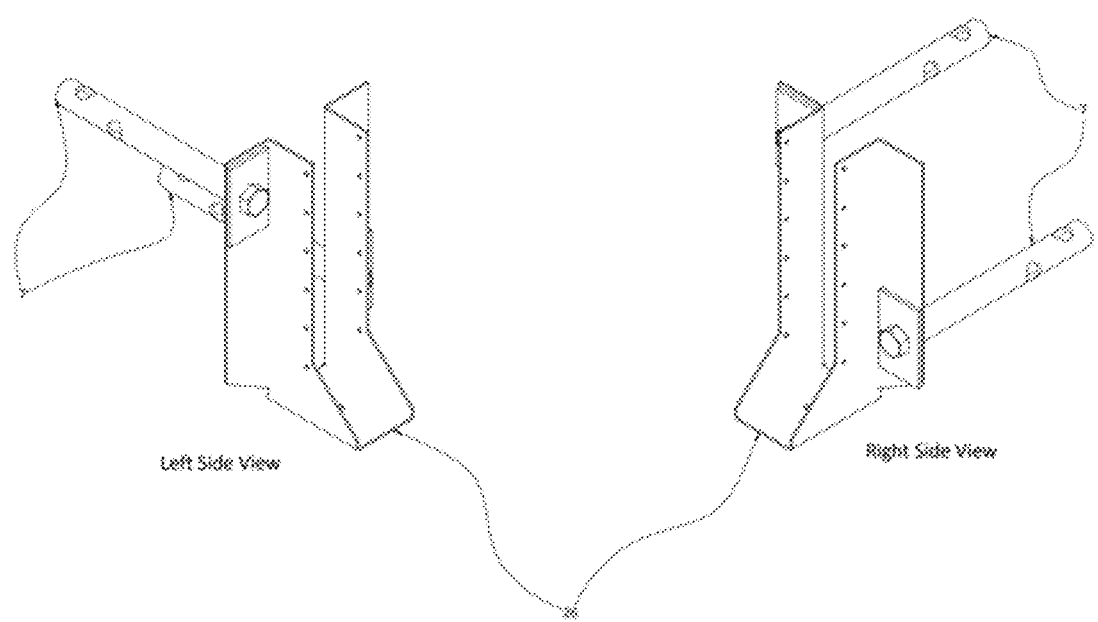
FIG. 7.—shows an isometric view of a Structural Connector fastened to another example of a Structural Component.

FIG. 7.—shows an isometric left and right side view of two Structural Connectors 7, fastened to a Structural Component 26, in this case a Joist hanger 26 that has a seat to receive joists, trusses and beams. (shown as an example in element 47 on FIG. 8).

FIG. 8 shows another example of a cross section of an ICF concrete wall 60, showing two structural connectors 7. One end of each structural connector is bolted to a secondary structural component 26, in this case a Joist hanger 26. The alternate end of the structural connectors 7, as shown as the middle and end of the cylinder tube section of the structural connector 10, is cast into the concrete 31 of the ICF the wall 60. As shown in FIG. 8, the ICF wall assembly 60 comprises of a rigid insulation from polystyrene panels 32, spaced to form a cavity within the ICF wall 60. Vertical holes are drilled through the ICF wall panel 32, to receive the structural connectors 7. The cylinder tube 10 section of the structural connectors 7, is inserted at the appropriate form panel 60, at each desired joist or beam location in the finished wall 32.

Reinforcement bars 30, are optional but may be installed via vertical 13 and horizontal 14 openings in the cylinder tube 10 section of the structural connectors 7.

Concrete 31, is then poured into the cavity of the ICF wall 60. Once the concrete 31, is cured, a joist or beam 47, is seated within the joist hanger 46 and nailed 50 or screwed to the Joist hanger 46, through openings in the joist hanger 46.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

What is claimed is:

1. A structural connector for use with insulated concrete formwork comprising:
   a cylinder tube having an inner barrel, and an outer barrel and vertical openings and horizontal openings to receive reinforcing bars and concrete;
   the cylinder tube has a threaded female section which threadably receives a double threaded washer head bolt;
   the cylinder tube connects with a secondary structural component;
   the double threaded washer head bolt has an outer thread which threads into the female thread of the cylinder tube connecting all structural components together;
   the double threaded washer head bolt creates a chamber inside the cylinder tube which protects the female threaded section in the cylinder tube from concrete seeping in;
   the double threaded washer head bolt has a washer head providing an enlarged surface for applying compressive forces to other structural components, and
   the double threaded washer head bolt has a female threaded section which threadably receives a second male threaded hex bolt.

2. The structural connector of claim 1 wherein the secondary structural component is selected from the group consisting of a L bracket, a ledger bracket and a joist hanger.

3. The structural connector of claim 1 wherein the vertical openings in the cylinder tube are vertically aligned.

4. The structural connector of claim 1 wherein the horizontal openings in the cylinder tube are horizontally aligned.

5. The structural connector of claim 1 wherein the end of the cylinder tube having the vertical and horizontal openings is embedded in a cured concrete wall.

6. The structural connector of claim 1 wherein a single structural connector can be used in multiple applications including mounting joist hangers and ledger boards to ICF wall systems.

7. The structural connector of claim 1 wherein a single structural connector for ledger boards fits all wood size thicknesses.

8. The structural connector of claim 1 wherein a main fixing point of the structural connector utilizes a one piece bolt assembly system that fixes structural components such as joist hangers and ledger boards to itself which is embedded in the cured concrete of an ICF wall system.

9. The structural connector of claim 1 wherein only two structural connectors are required to fix structural components to an ICF wall.

10. The structural connector of claim 1 wherein the cylinder bolt assembly does not protrude from an ICF wall making it easier to install ICF wall bracing systems and pour concrete.

11. The structural connector of claim 1 wherein the structural connector includes double and triple sheer points which more efficiently absorbs energy of an unsupported load transfer span between a polystyrene outer and inner walls of an Insulated concrete wall system; and which further enhances strength, stiffness of connection, function and durability.

12. The structural connector of claim 1 wherein the double threaded washer head bolt is adjustable internally for connecting multiple wood and steel sizes to the outside of an ICF wall.

\* \* \* \* \*